United States Patent
Thorn et al.

(10) Patent No.: US 11,165,953 B1
(45) Date of Patent: Nov. 2, 2021

(54) FRAMING RECOMMENDATIONS BY IMAGE CAPTURE DEVICE

(71) Applicant: GoPro, Inc., San Mateo, CA (US)

(72) Inventors: Jonathan Leland Thorn, San Leandro, CA (US); Clark Weber, San Mateo, CA (US)

(73) Assignee: GOPRO, INC., San Mateo, CA (US)

( * ) Notice: Subject to any disclaimer, the term of this patent is extended or adjusted under 35 U.S.C. 154(b) by 0 days.

(21) Appl. No.: 17/125,974

(22) Filed: Dec. 17, 2020

(51) Int. Cl.
*H04N 5/222* (2006.01)
*H04N 5/232* (2006.01)
*H04N 5/225* (2006.01)
*H04N 5/262* (2006.01)

(52) U.S. Cl.
CPC ....... *H04N 5/23222* (2013.01); *H04N 5/2252* (2013.01); *H04N 5/23219* (2013.01); *H04N 5/232945* (2018.08); *H04N 5/2628* (2013.01); *H04N 5/2253* (2013.01); *H04N 5/2254* (2013.01); *H04N 5/22525* (2018.08)

(58) Field of Classification Search
CPC .......................... H04N 1/0044; H04N 1/00183
See application file for complete search history.

(56) References Cited

U.S. PATENT DOCUMENTS

| | | | | |
|---|---|---|---|---|
| 2009/0303352 A1* | 12/2009 | Fujinawa | ........... | H04N 1/00442 348/231.99 |
| 2011/0008036 A1* | 1/2011 | Takatsuka | .............. | G03B 15/00 396/283 |
| 2011/0110266 A1* | 5/2011 | Li | ........... | H04W 56/00 370/253 |
| 2013/0038759 A1* | 2/2013 | Jo | .................... | H04N 5/232945 348/240.99 |
| 2013/0141623 A1* | 6/2013 | Akita | .................. | H04N 5/23219 348/333.01 |
| 2014/0247325 A1* | 9/2014 | Wu | ..................... | H04N 5/23238 348/39 |
| 2015/0334292 A1* | 11/2015 | Tartz | .................. | H04N 5/23218 348/222.1 |
| 2017/0374280 A1* | 12/2017 | Chan | .................. | H04N 5/23293 |
| 2018/0255237 A1* | 9/2018 | Salem | ........................ | G06T 7/74 |
| 2019/0253614 A1* | 8/2019 | Oleson | .............. | H04N 5/23216 |
| 2020/0089097 A1* | 3/2020 | Eckhouse | ................. | G06T 7/33 |

(Continued)

*Primary Examiner* — Gary C Vieaux
(74) *Attorney, Agent, or Firm* — Esplin & Associates, PC

(57) ABSTRACT

An image capture device may provide framing recommendations for capture of visual content. Framing recommendation may include information on how one or more subjects are to be positioned with respect to the image capture device. Framing recommendation may guide a user in how the image capture device and/or the subject(s) are to be positioned. Framing recommendation may include suggestions on orientation of the image capture device with respect to the subject(s) to improve composition of the subject(s) within the visual content. The image capture device may provide these aforementioned framing recommendations visually, audibly, and/or through other means. For example, the image capture device may provide framing recommendations in form of visual overlays/directional graphs and/or audible instructions (e.g., directions on subject/image capture device positioning provided through a speaker of the image capture device). Framing recommendation may be static (not changing over time) or dynamic (changing over time).

20 Claims, 11 Drawing Sheets

(56) References Cited

U.S. PATENT DOCUMENTS

| | | | |
|---|---|---|---|
| 2020/0125880 A1* | 4/2020 | Wang | G06K 9/3241 |
| 2020/0211175 A1* | 7/2020 | Kunik | G06T 7/70 |
| 2021/0068788 A1* | 3/2021 | Yang | A61B 8/483 |
| 2021/0185222 A1* | 6/2021 | Zavesky | H04N 5/23225 |

* cited by examiner display 400 framing recommendation 430 arrow indicator 432 display 400 framing recommendation 440 arrow indicator 442

FRAMING RECOMMENDATIONS BY IMAGE CAPTURE DEVICE

FIELD

This disclosure relates to an image capture device that provides recommendations for framing.

BACKGROUND

A user may capture images/videos using an image capture device. Subject of the images/videos may not be properly framed during capture of the images/videos. Correcting improperly framed images/videos during postproduction may be difficult or not possible.

SUMMARY

This disclosure relates to providing framing recommendations. An image capture device may include a housing. The housing may have multiple sides. The housing may carry one or more of an image sensor, an optical element, a display, and/or other components. The optical element may be carried on a first side of the housing. The optical element may guide light within a field of view to the image sensor. The image sensor may generate a visual output signal conveying visual information defining visual content based on light that becomes incident thereon. The display may be carried on the first side of the housing. The visual content may be captured during a capture duration. A framing recommendation may be presented on the display. The framing recommendation may include information on how a subject is to be positioned with respect to the image capture device for future capture of the visual content.

An electronic storage may store visual information defining visual content, information relating to visual content, information relating to framing recommendation, information relating to subject, and/or other information.

The housing may have multiple sides. The housing carry one or more components of the image capture device. The housing may carry (be attached to, support, hold, and/or otherwise carry) one or more of an image sensor, an optical element, a display, a processor, an electronic storage, and/or other components. The optical element and the display may be carried on the same side of the housing. The optical element and the display may be carried on a first side of the housing. In some implementations, the housing may carry multiple displays. In some implementations, the housing may carry multiple image sensors and multiple optical elements.

The image sensor may be configured to generate a visual output signal and/or other output signals. The visual output signal may convey visual information based on light that becomes incident on the image sensor and/or other information. The visual information may define visual content.

The optical element may be configured to guide light within a field of view to the image sensor. The field of view may be less than 180 degrees. The field of view may be equal to 180 degrees. The field of view may be greater than 180 degrees.

The processor(s) may be configured by machine-readable instructions. Executing the machine-readable instructions may cause the processor(s) to facilitate providing framing recommendations. The machine-readable instructions may include one or more computer program components. The computer program components may include one or more of a capture component, a recommendation component, and/or other computer program components.

The capture component may be configured to capture the visual content during one or more capture durations. The visual content may be captured through the optical element.

The recommendation component may be configured to present a framing recommendation on a display. The display may be carried on the same side of the housing as the optical element. The framing recommendation may include information on how a subject is to be positioned with respect to the image capture device for future capture of the visual content.

In some implementations, the framing recommendation may include one or more outlines of how the subject should be depicted within the visual content. In some implementations, the outline(s) of how the subject should be depicted within the visual content may be overlaid on top of a preview of the visual content captured during the capture duration. In some implementations, the preview of the visual content may include a silhouette representation of the visual content.

In some implementations, the framing recommendation may include one or more arrow indicators that points in a direction in which the subject and/or the image capture device should be moved. In some implementations, size or color of an arrow indicator may indicate an extent to which the subject or the image capture device should be moved.

In some implementations, the framing recommendation may include a preview of the visual content captured during the capture duration. The preview may include an enlarged portion in which the subject should be located. An extent of the visual content within the enlarged portion may be warped to increase size of depiction within the enlarged portion.

In some implementations, the framing recommendation may be presented on the display responsive to a face or a person being within the visual content captured during the capture duration.

In some implementations, the image capture device may further comprise another display carried on a second side of the housing. The framing recommendation may not be presented on the other display during presentation of the framing recommendation on the display. In some implementations, the other display may be deactivated during the presentation of the framing recommendation on the display.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
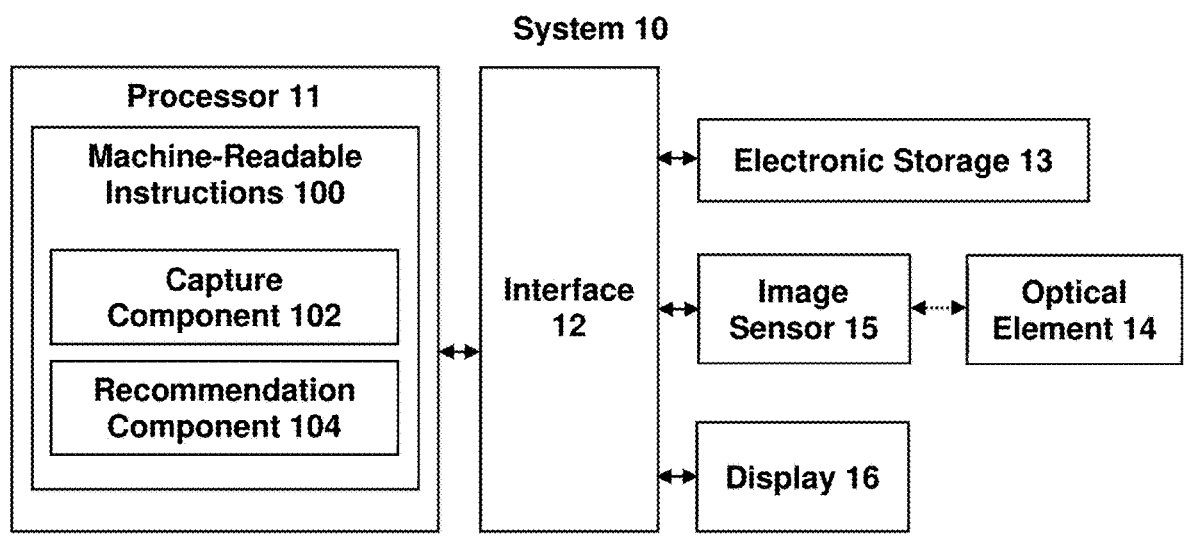
FIG. 1 illustrates an example system that provides framing recommendations.

FIG. 1 illustrates a system 10 for providing framing recommendations. The system 10 may include one or more of a processor 11, an interface 12 (e.g., bus, wireless interface), an electronic storage 13, an optical element 14, an image sensor 15, a display 16, and/or other components. The system 10 may include and/or be part of an image capture device. The image capture device may include a housing having multiple sides, and one or more of the optical element 14, the image sensor 15, the display 16, and/or other components of the system 10 may be carried by the housing of the image capture device. The optical element 14 and the display 16 may be carried on the same side of the housing. The optical element 14 may guide light within a field of view to the image sensor 15. The image sensor 15 may generate a visual output signal conveying visual information based on light that becomes incident thereon. The visual information may define visual content.

The visual content may be captured by the processor 11 during a capture duration. A framing recommendation may be presented on the display 16. The framing recommendation may include information on how a subject is to be positioned with respect to the image capture device for future capture of the visual content.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information defining visual content, information relating to visual content, information relating to framing recommendation, information relating to subject, and/or other information.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the optical element 14, the image sensor 15, and/or the display 16 of the system 10 may be carried by the housing of the image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet).

Figure 3A:
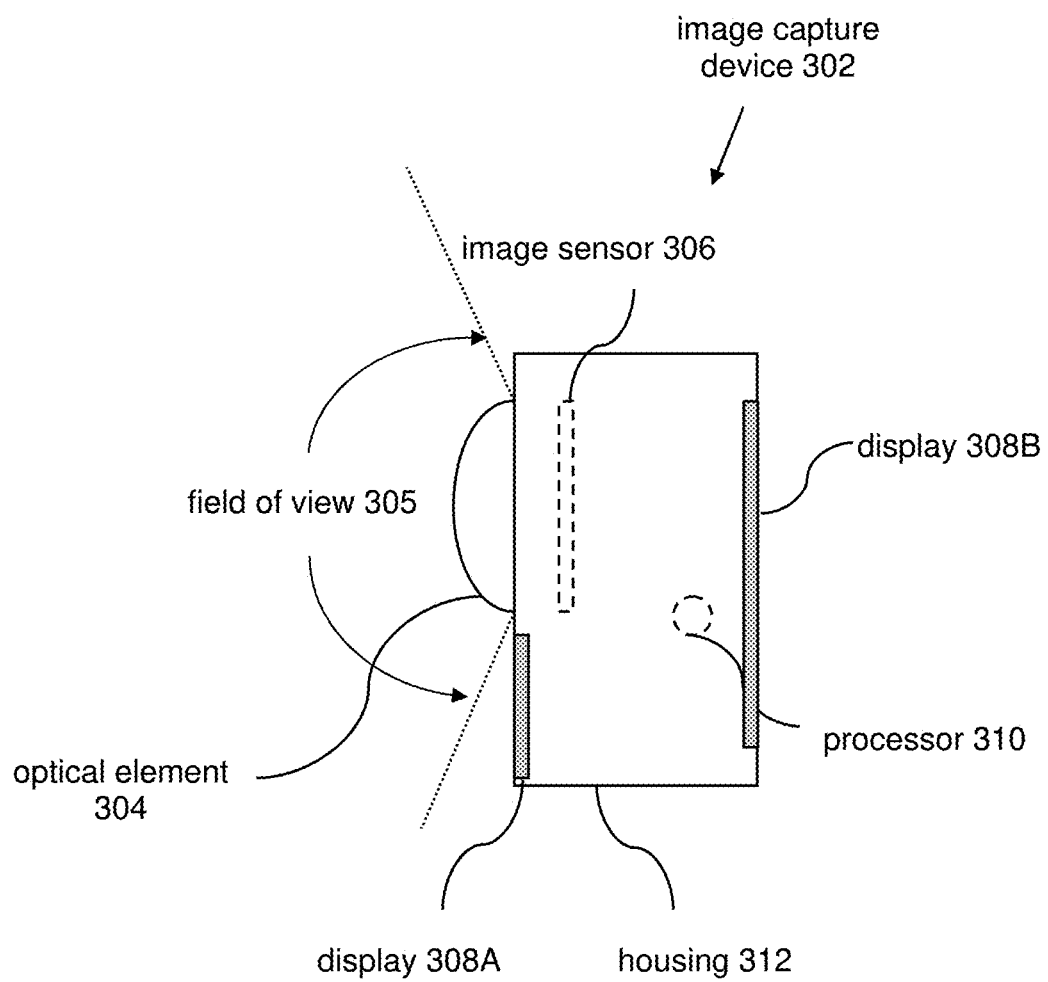
FIGS. 3A and 3B illustrate example image capture devices.

FIG. 3A illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may have multiple sides. The housing 312 carry one or more components of the image capture device 302. The housing 312 may carry (be attached to, support, hold, and/or otherwise carry) one or more of an optical element 304, an image sensor 306, a display 308A, a display 308B, a processor 310, and/or other components.

The optical element 304 and the display 308A may be carried on the same side of the housing. For example, the optical element 304 and the display 308A may be carried on a front side of the housing 312. The display 308A may be a front-facing display of the image capture device 302. In some implementations, the housing 312 may carry multiple displays, such as shown in FIG. 3A. The display 308B may be carried on a rear side of the housing 312. The display 308B may be a rear-facing display of the image capture device 302.

Figure 3B:
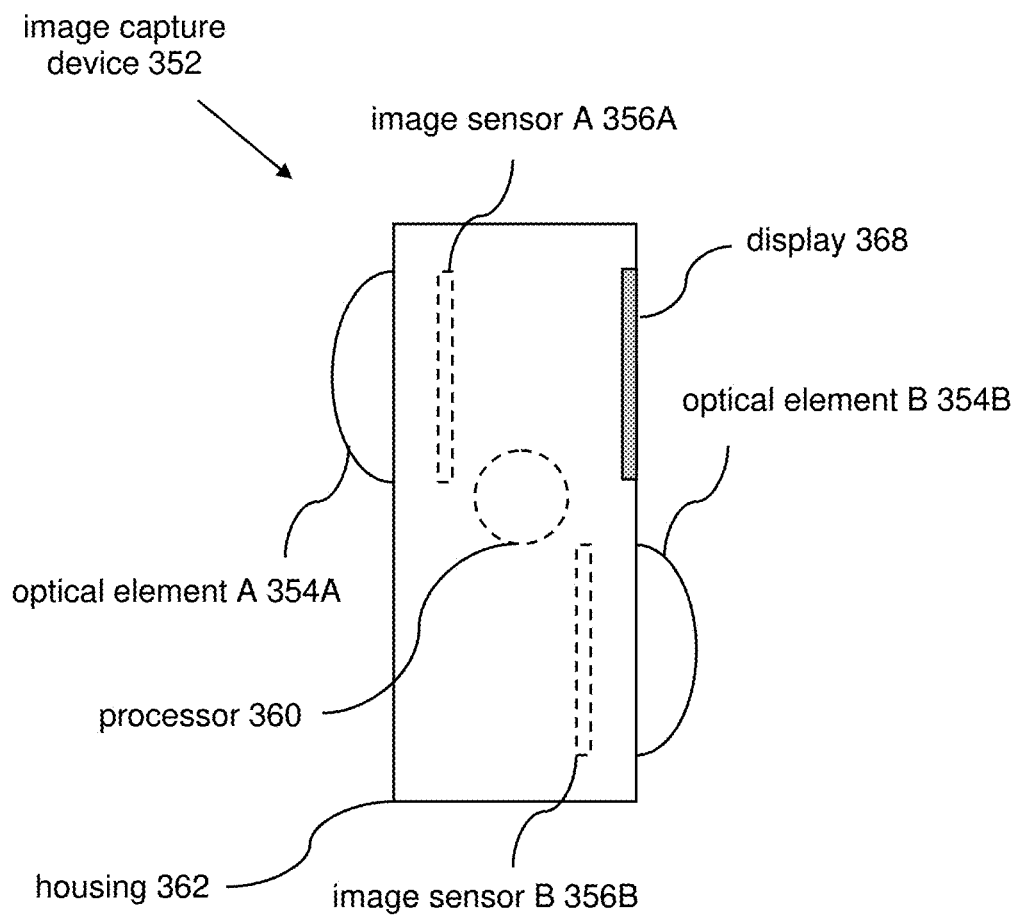

In some implementations, the housing may carry multiple image sensors and multiple optical elements. FIG. 3B illustrates an example image capture device 352. Visual content (e.g., of spherical image(s), spherical video frame(s)) may be captured by the image capture device 352. The image capture device 352 may include a housing 362. The housing 362 carry one or more components of the image capture device 352. The housing 362 may carry one or more of an optical element A 354A, an optical element B 354B, an image sensor A 356A, an image sensor B 356B, a display 368, a processor 360, and/or other components.

One or more components of the image capture device may be the same as, be similar to, and/or correspond to one or more components of the system 10. For example, referring to FIG. 3A, the processor 310 may be the same as, be similar to, and/or correspond to the processor 11. The optical element 304 may be the same as, be similar to, and/or correspond to the optical element 14. The image sensor 306 may be the same as, be similar to, and/or correspond to the image sensor 15. The display 308A may be the same as, be similar to, and/or correspond to the display 16. The housing may carry other components, such as the electronic storage 13. The image capture device may include other components not shown in FIGS. 3A and 3B. The image capture device may not include one or more components shown in FIGS. 3A and 3B. Other configurations of image capture devices are contemplated.

An optical element may include instrument(s), tool(s), and/or medium that acts upon light passing through the instrument(s)/tool(s)/medium. For example, an optical element may include one or more of lens, mirror, prism, and/or other optical elements. An optical element may affect direction, deviation, and/or path of the light passing through the optical element. An optical element may have a field of view (e.g., field of view 305 shown in FIG. 3A). The optical element may be configured to guide light within the field of view (e.g., the field of view 305) to an image sensor (e.g., the image sensor 306).

The field of view may include the field of view of a scene that is within the field of view of the optical element and/or the field of view of the scene that is delivered to the image sensor. For example, referring to FIG. 3A, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device may include multiple optical elements. The image capture device may include multiple optical elements that are arranged on the housing to capture spherical images/videos (guide light within spherical field of view to one or more images sensors). For instance, referring to FIG. 3B, the image capture device 352 may include two optical elements 354A, 354B positioned on opposing sides of the housing 362. The fields of views of the optical elements 354A, 354B may overlap and enable capture of spherical images and/or spherical videos.

An image sensor may include sensor(s) that converts received light into output signals. The output signals may include electrical signals. The image sensor may generate output signals conveying visual information that defines visual content of one or more images and/or one or more video frames of a video. For example, the image sensor may include one or more of a charge-coupled device sensor, an active pixel sensor, a complementary metal-oxide semiconductor sensor, an N-type metal-oxide-semiconductor sensor, and/or other image sensors.

The image sensor may be configured generate output signals conveying information that defines visual content of one or more images and/or one or more video frames of a video. The image sensor may be configured to generate a visual output signal based on light that becomes incident thereon during a capture duration and/or other information. The visual output signal may convey visual information that defines visual content having the field of view. For example, referring to FIG. 3A, the optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor may include conversion of light received by the image sensor into output signals/visual information defining visual content. Capturing visual content may include recording, storing, and/or otherwise capturing the visual content for use in previewing and/or generating video content (e.g., content of video frames). For example, during a capture duration, the visual output signal generated by the image sensor 306 and/or the visual information conveyed by the visual output signal may be used to record, store, and/or otherwise capture the visual content for use in previewing and/or generating video content.

In some implementations, the image capture device may include multiple image sensors. For example, the image capture device may include multiple image sensors carried by the housing to capture spherical images/videos based on light guided thereto by multiple optical elements. For instance, referring to FIG. 3B, the image capture device 362 may include two image sensors 356A, 356B configured to receive light from two optical elements 354A, 354B positioned on opposing sides of the housing 362.

A display may refer to an electronic device that provides visual presentation of information. A display may include a color display and/or a non-color display. In some implementations, a display may include one or more touchscreen displays. A display may be configured to visually present information. A display may be configured to present visual content, user interface, and/or other information. User interface (graphical user interface) may include a graphical form that enables a user to interact with the image capture device and/or see information provided by the image capture device. For example, referring to FIG. 3A, the display 308A and/or the display 308B may present framing recommendations, preview of visual content being captured by the image capture device 302 (e.g., preview of visual content before and/or during recording), visual content that has been captured by the image capture device 302, setting information of the image capture device 302 (e.g., resolution, framerate, mode), and/or other information for the image capture device 302.

The display 308A (front-facing display) may enable a user to see framing recommendations, visual content being captured by the image capture device 302, the user interface, the user interface elements, and/or other information while the image capture device 302 is pointed towards the user, such as when the user is in front of the image capture device 302. The display 308B (rear-facing display) may enable a user to see framing recommendations, visual content being captured by the image capture device 302, the user interface, the user interface elements, and/or other information while the image capture device 302 is pointed away from the user, such as when the user is behind the image capture device 302. The display 308A may be smaller than the display 308B. In some implementations, the display 308A may have an aspect ratio of 1:1. In some implementations, the display 308A may have a different aspect ratio than the display 308B. For example, the display 308A may be a square display while the display 308B may be a wide/non-square display.

A processor may include one or more processors (logic circuitry) that provide information processing capabilities in the image capture device. The processor may provide one or more computing functions for the image capture device. The processor may operate/send command signals to one or more components of the image capture device to operate the image capture device. For example, referring to FIG. 3A, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or facilitate transfer of information from the image sensor 306 to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

The image capture device 302 may provide framing recommendations for capture of visual content by the image capture device 302. A framing recommendation may include information on how one or more subjects are to be positioned with respect to the image capture device 302 for future capture of the visual content. The framing recommendation may guide a user in how the image capture device 302 and/or the subject(s) are to be positioned for future capture of the visual content by the image capture device 302. Framing recommendation may include suggestions on orientation of the image capture device 302 with respect to the subject(s) to improve composition of the subject(s) within the visual content. The image capture device 302 may provide framing recommendations visually, audibly, and/or through other means. For example, the image capture device 302 may provide framing recommendation in the form of visual overlays/directional graphs (presented on the display 308A, 308B), and/or audible instructions (e.g., directions on subject/image capture device 302 positioning provided through speaker of the image capture device 302).

Referring back to FIG. 1, the processor 11 (or one or more components of the processor 11) may be configured to obtain information to facilitate automatic control of display operation. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, an inertial measurement unit, a gyroscope, a accelerometer; one or more components shown in FIGS. 1, 3A, and 3B) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, convolutional neural networks, generative adversarial networks, and/or other mechanisms for electronically processing information. The processor 11 may be configured to execute one or more machine-readable instructions 100 to facilitate providing framing recommendations. The machine-readable instructions 100 may include one or more computer program components. The machine-readable instructions 100 may include one or more of a capture component 102, a recommendation component 104, and/or other computer program components.

The capture component 102 may be configured to capture the visual content during one or more capture durations. A capture duration may refer to a time duration in which visual content is captured. The visual content may be captured through one or more optical elements (e.g., the optical element 14). For example, referring to FIG. 3A, the visual content may be captured through the optical element 304. Referring to FIG. 3B, the visual content may be captured through the optical element A 354A and/or the optical element B 354B. The visual content may have the field of view of the optical element(s).

Capturing visual content during a capture duration may include using, recording, storing, and/or otherwise capturing the visual content during the capture duration. For instance, visual content may be captured while the image capture device is operating in a record mode (e.g., video recording mode) and/or operating in a preview mode (e.g., showing preview of visual content to be captured on a display). The visual content may be captured for use in generating images and/or video frames. The images/video frames may be stored in electronic storage and/or deleted after use (e.g., after preview).

For example, during a capture duration, the capture component 102 may use the visual output signal generated by the image sensor 15 and/or the visual information conveyed by the visual output signal to record, store, and/or otherwise capture the visual content. For instance, the capture component 102 may store, in the electronic storage 13 and/or other (permanent and/or temporary) electronic storage medium, information (e.g., the visual information) defining the visual content based on the visual output signal generated by the image sensor 15 and/or the visual information conveyed by the visual output signal during the capture duration. In some implementations, information defining the captured visual content may be stored in one or more visual tracks. In some implementations, the information defining the visual content may be discarded. For instance, the visual information defining the visual content may be temporarily stored (e.g., in a buffer) to provide framing recommendation, and the visual information may be deleted after the determination and/or presentation of the framing recommendation.

The recommendation component 104 may be configured to provide one or more framing recommendations. A framing recommendation may be provided via presentation on one or more displays (e.g., the display 16) and/or through one or more speakers. Provision of a framing recommendation may include visual provision of the framing recommendation (e.g., using graphics on a display to show/achieve proper framing, showing textual instructions on how to achieve proper framing on a display) and/or audible provision of the framing recommendation (e.g., voice instructions on how to achieve proper framing, voice confirmation of proper framing). In some implementations, a framing recommendation may include information on the extent to which framing of things within the visual content matches/satisfies the framing recommendation. For example, a framing recommendation may include a confidence indicator that states whether or not proper framing has been achieved and/or to what extent (e.g., percentage-wise) proper framing has been achieved.

A framing recommendation may refer to a suggestion, proposal, and/or guidance on how to frame/position/place one or more subjects within visual content (e.g., of image(s), video frame(s)) for capture. A framing recommendation may be static (not changing over time) or dynamic (changing over time). A framing recommendation may include information on how one or more subjects are to be positioned with respect to the image capture device for future capture of the visual content. A framing recommendation may include information on recommended/suggested placement of subject(s) within the field of view of the visual content. A subject may refer to a living thing and/or a non-living thing to be captured/depicted within the visual content. For example, a subject may include a person, an animal, an object, a vehicle, a structure, an environment, and/or other living and/or non-living thing.

In some implementations, a framing recommendation may include a preview of the visual content captured during the capture duration. The framing recommendation may use the preview of the visual content to provide suggestion, proposal, and/or guidance on how to frame/position/place one or more subjects within the visual content. For instance, the framing recommendation may include graphics overlaid on top of the preview of the visual content, with the graphics indicating proper framing of subject(s) and/or how to achieve proper framing of subject(s).

A framing recommendation may be determined and/or selected for provision based on user input, context of visual content capture, and/or other information. For example, user input may specify a particular type/style of framing desired by the user in capturing visual content. User input may be received at the image capture device and/or through a computing device communicatively coupled to the image capture device (e.g., mobile device paired with the image capture device). In some implementations, a user may be presented with options to select different types/styles of framing, and the user input may be received through user selection of the options. In some implementations, a user may be presented to turn on or turn off the provision of framing recommendation. For example, a setting of the image capture device may be changeable by the user to turn on or turn off the provision of framing recommendation by the image capture device.

Context of visual content capture may refer to circumstances and/or conditions of the subject, setting, and/or scene that is captured/to be captured within the visual content. Context of the visual content capture may include circumstances and/or conditions of the image capture device during capture of the visual content. Context of the visual content capture may include circumstances and/or conditions of one or more scenes (e.g., things within field of view of the image capture device) that are captured/to be captured within the visual content. For example, a framing recommendation may be determined and/or selected for provision based on analysis of visual content and/or audio content captured by the image capture device, based on analysis of metadata of the image capture device (e.g., time, date, location, motion), and/or other information.

For example, a framing recommendation may be determined and/or selected for provision based analysis of visual content captured by the capture component 102. Analysis of the visual content may include examination, evaluation, processing, studying, and/or other analysis of the visual content. For example, analysis of the visual content may include examination, evaluation, processing, studying, and/or other analysis of one or more visual features/characteristics of the visual content. Analysis of the visual content may include segmentation of the visual content, saliency/blob detection within the visual content, recognition of things captured within the visual content (e.g., recognition of object, person, face, emotion, scene, action). Analysis of the visual content may include determination of whether and/or to what extent the visual content satisfies one or more aesthetic rules, such as rule of thirds, balanced composition, and/or center weighted composition. Analysis of the visual content may include determination of whether and/or to what extent depiction of things within the visual content needs to be moved to satisfy one or more aesthetic rules. Other determination/selection of framing recommendation is contemplated.

Analysis of the visual content may include analysis of visual content of a single image/video frame and/or analysis of visual content of multiple images/video frames. In some implementations, analysis of the visual content may include use of statistics and/or vectors to determine trajectory of moving things within the visual content. The trajectory may be used to provide framing recommendation on how to keep up with the moving things while capturing the visual content.

In some implementations, a display on which the framing recommendation is presented may be carried on the same side of the housing as the optical element through which the visual content is captured. For example, referring to FIG. 3A, the image capture device 302 may capture the visual content through the optical element 304, and the framing recommendation may be presented on the display 308A (e.g., front-facing display). Presentation of the framing recommendation on a front-facing display may enable a user to determine/change framing while capturing visual content. For example, a user may be able to determine whether a subject (e.g., target, user's face/body) is properly positioned within the visual content. If the position/depiction of the subject within the visual content does not match the framing recommendation, then the user may change orientation/positioning of the image capture device to the subject until the subject is properly positioned/depicted within the visual content.

FIGS. 4A, 4B, 4C, 4D, and 4E illustrate example framing recommendations presented on a display 400. The display 400 may be a square display. In some implementations, the display 400 may be a front-facing display of an image capture device. Other shapes, sizes, and types of display are contemplated.

In some implementations, the framing recommendation may include one or more outlines of how a subject should be depicted within the visual content. In some implementations, the outline(s) of how the subject should be depicted within the visual content may be overlaid on top of a preview of the visual content captured during the capture duration. For example, referring to FIG. 4A, a framing recommendation 410 may be presented on the display 410. The framing recommendation 410 may include an outline 412. The outline 412 may show how a person should be depicted within the visual content to achieve proper framing. The framing recommendation 410 may include presentation of preview of visual content captured by the image capture device. Presenting the outline 412 on top of the preview may enable a user to change the orientation of the image capture device to the subject (by moving the image capture device and/or the subject) while seeing in real time how the subject is depicted within the visual content. For example, a user may change the orientation of the image capture device to the subject until the subject matches/fits within the outline 412.

In some implementations, the preview of the visual content may include a silhouette representation of the visual content. A silhouette representation of the visual content may include a two-dimensional representation of the visual content. A silhouette presentation of the visual content may include a two-dimensional representation of one or more subjects. A silhouette presentation of the visual content may include a two-dimensional representation of a subject as an outline filled with single color/shading).

For example, a silhouette representation of visual content including a person may include an outline of the person uniformly filled with a single color/shading. For example, referring to FIG. 4B, a framing recommendation 420 may be presented on the display 410. The framing recommendation 420 may include an outline 422. The outline 422 may show how a person should be depicted within the visual content to achieve proper framing. The framing recommendation 420 may include a silhouette representation 424. The silhouette representation 424 may include an outline of a person captured within the visual content, with the outline uniformly filled with a single color/shading. Presenting the outline 422 and the silhouette representation 424 may enable a user to change the orientation of the image capture device to the subject (by moving the image capture device and/or the subject) while seeing in real time how the subject is depicted within the visual content. For example, a user may change the orientation of the image capture device to the subject until the silhouette representation matches/fits within the outline 422.

In some implementations, the framing recommendation may include one or more arrow indicators. An arrow indicator may point in a direction in which the subject and/or the image capture device should be moved (translationally and/or rotationally). In some implementations, size and/or color of an arrow indicator may indicate an extent to which the subject or the image capture device should be moved. For example, a bigger arrow and/or a particular color may indicate that the subject or the image capture device needs to be moved more than a smaller arrow and/or a different color.

Figure 4A:
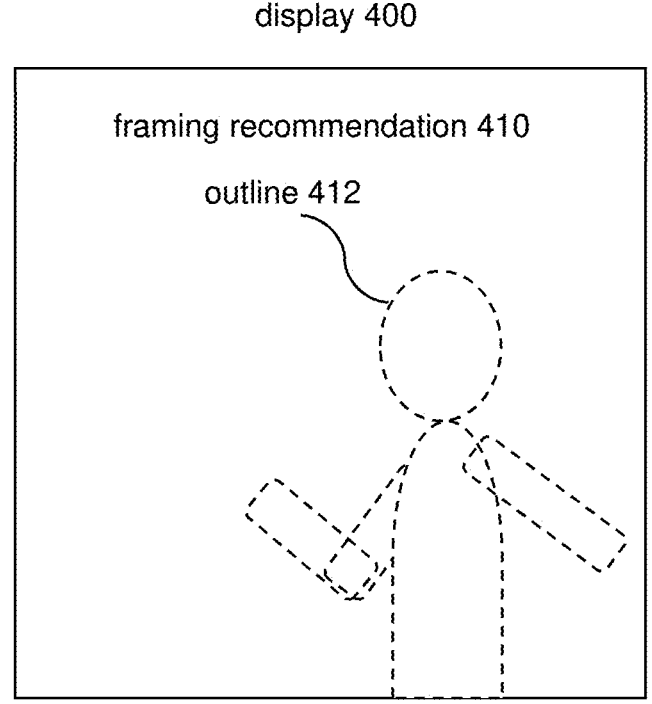
FIGS. 4A, 4B, 4C, 4D, and 4E illustrate example framing recommendations.
Figure 4B:
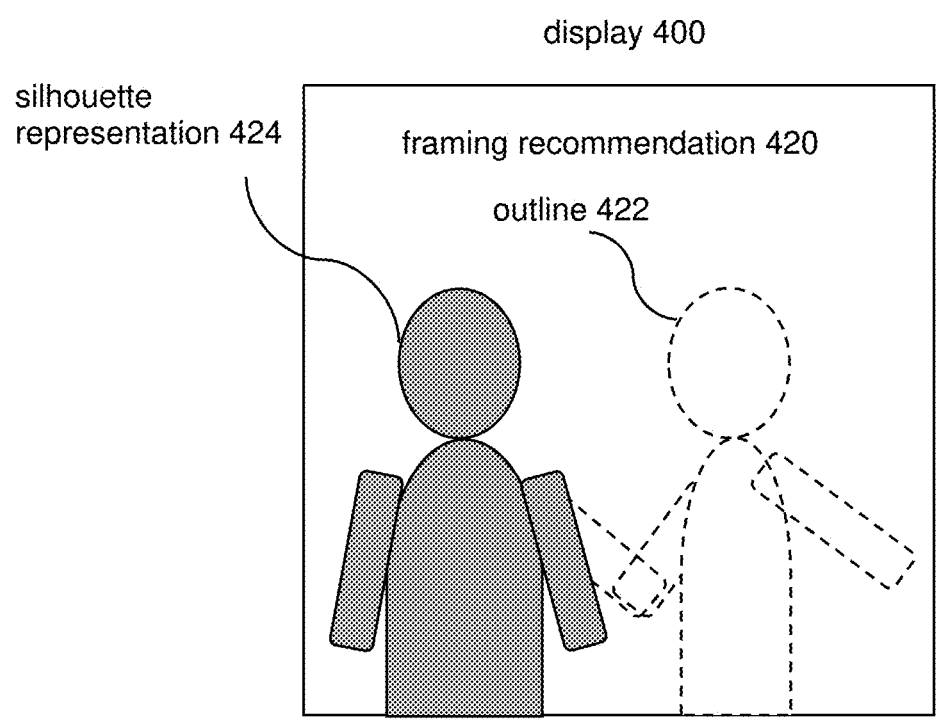
Figure 4C:
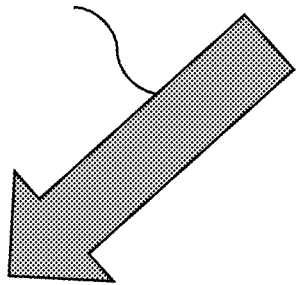

For example, referring to FIG. 4C, a framing recommendation 430 may be presented on the display 400. The framing recommendation 430 may include an arrow indicator 432. The arrow indicator 432 may point down and to the left, indicating that the subject and/or the image capture device should be moved down and to the left. The size and/or color of the arrow indicator 432 may indicator how far the subject and/or the image capture device needs to be moved down and to the left to achieve proper framing.

Figure 4D:
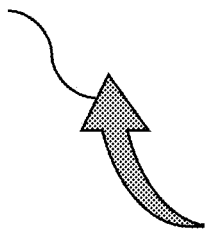

Referring to FIG. 4D, a framing recommendation 440 may be presented on the display 400. The framing recommendation 440 may include an arrow indicator 442. The arrow indicator 442 may point upwards with a curvature, indicating that the subject and/or the image capture device should be tilted up. The size and/or color of the arrow indicator 442 may indicator how far the subject and/or the image capture device needs to be tilted up to achieve proper framing.

In some implementations, the framing recommendation may include a preview of the visual content captured during the capture duration. The preview may include an enlarged portion in which the subject should be located. An extent of the visual content within the enlarged portion may be warped to increase size of depiction within the enlarged portion. The increase in size of depiction within the enlarged portion may be greater than in other portions of the preview. In some implementations, different image projection may be used for the enlarged portion versus other portion of the preview. For example, a non-linear projection (in which straight lines appear as curved lines) may be used for the enlarged portion while a linear projection (in which straight lines appear as straight lines) may be used for other portions of the preview.

Figure 4E:
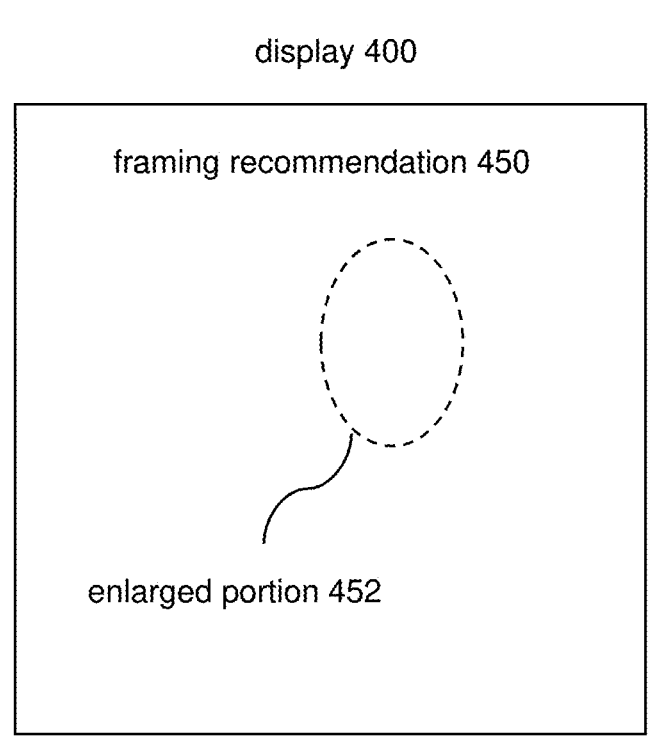

For example, referring to FIG. 4E, a framing recommendation 450 may be presented on the display 400. The framing recommendation 450 may include a preview of the visual content. The framing recommendation 450 may include an enlarged portion 452 in which the extent of the visual content is warped to increase size of depiction. A user may determine whether and/or to what extent the subject has been properly framed within the visual content by checking whether and/or to what extent the subject appears within the enlarged portion 452 (e.g., the subject appears magnified in the framing recommendation). For example, a user may determine whether and/or to what extent a face has been properly framed within the visual content by whether and/or to what extent the face appears within the enlarged portion 452. Use of the enlarged portion 452 may enable a user to get a closer/larger view of the subject while framing. For example, use of the enlarged portion 452 may enable a user to get a closer/larger view of the face while framing.

In some implementations, the preview of the visual content on a display may be cropped and/or distorted. For example, the aspect ratio of the display may not match the aspect ratio of the display. The visual content may be presented on the display by cropping out portion(s) of the visual content (e.g., display center portion of the visual content while cropping out lateral portions). The visual content may be presented on the display by laterally squeezing the visual content. Such presentation of the preview may make it difficult for a user to determine whether proper framing has been achieved.

Figure 5A:
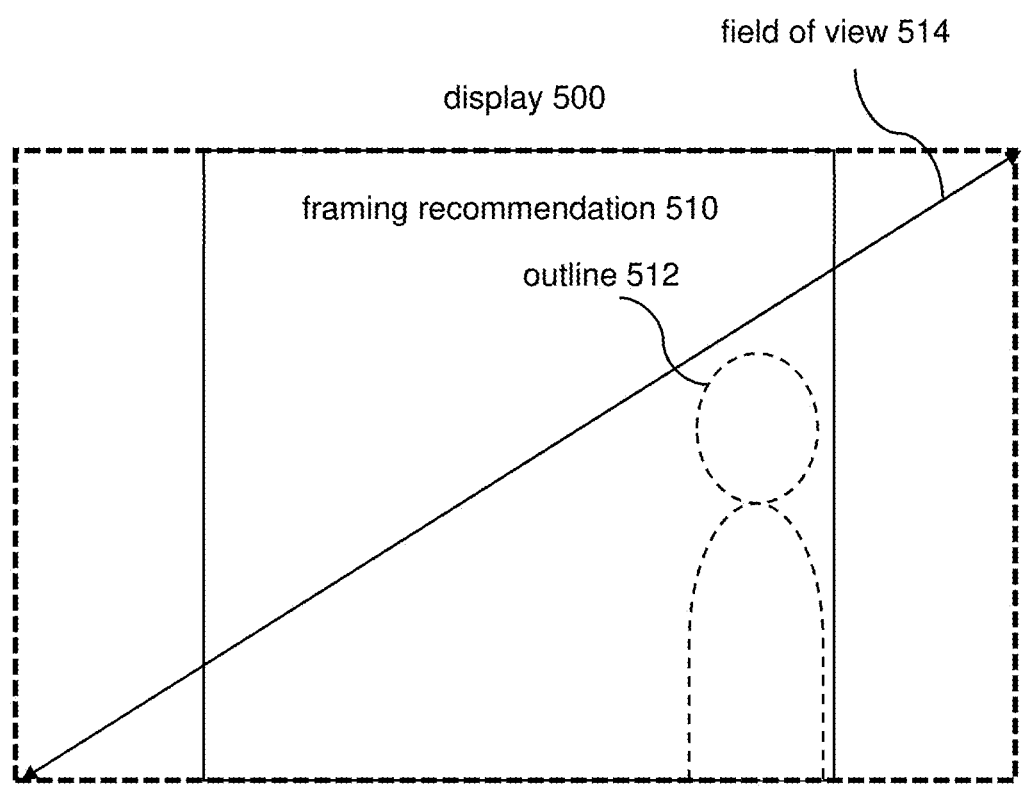
FIGS. 5A and 5B illustrate example framing recommendations.
Figure 5B:
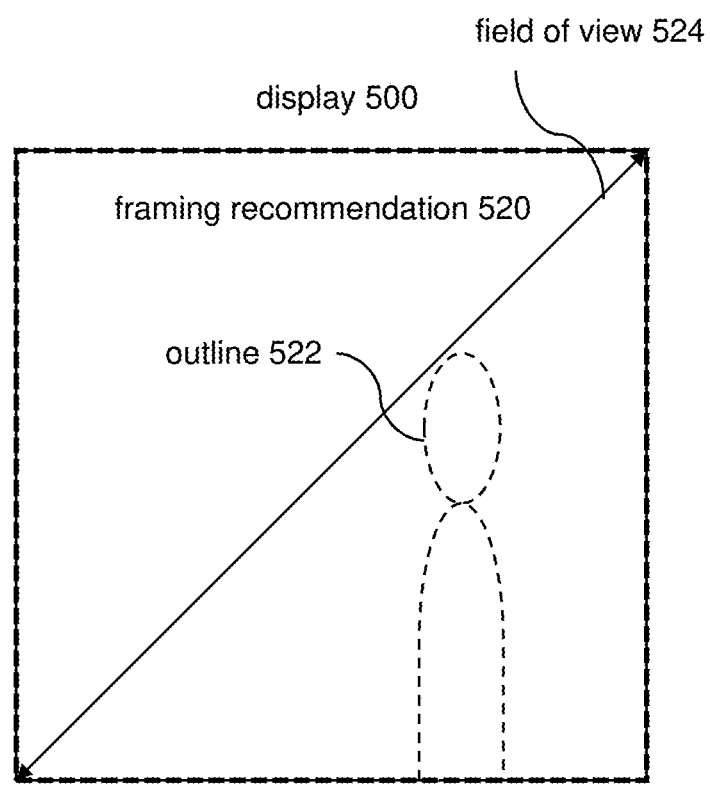

The framing recommendation may take into account cropping and/or distortion of the preview. The visual elements of the framing recommendation may be adjusted based on the cropping and/or distortion of the preview so that subject(s) are properly framed within the visual content. FIGS. 5A and 5B illustrate example framing recommendations presented on a display 500. The display 500 may be a square display. In some implementations, the display 500 may be a front-facing display of an image capture device. Other shapes, sizes, and types of display are contemplated.

Referring to FIG. 5A, a framing recommendation 510 may be presented on the display 500. The framing recommendation 510 may include a preview of the visual content. A field of view 514 of the visual content may be larger than the display, and the preview may include the visual content cropped so that only the center portion of the visual content is included within the preview, and left and right portions of the visual content not included within the preview. The framing recommendation 510 may include an outline 512. The outline 512 may show how a person should be depicted within the visual content to achieve proper framing. The framing recommendation 510 may take into account cropping of the visual content within the preview. The outline 512 may be positioned within the framing recommendation based on the field of view 514 of the visual content. While positioning the subject within the outline 512 may make framing of the subject to be off (e.g., placed too far to the right), such positioning of the subject may achieve proper framing within the uncropped visual content.

Referring to FIG. 5B, a framing recommendation 520 may be presented on the display 500. The framing recommendation 520 may include a preview of the visual content. A field of view of the visual content may be larger than the display, and the preview may include the visual content laterally squeezed to fit the entire visual content onto the display 500. The framing recommendation 520 may include an outline 522. The outline 522 may show how a person should be depicted within the visual content to achieve proper framing. The framing recommendation 520 may take into account squeezing of the visual content within the preview. The outline 522 may be distorted (squeezed) to match the distortion of the visual content within the preview. Distortion of the visual content within the preview may make it difficult for a user to determine actual location of the subject within the visual content. Positioning the subject within the outside 522 may achieve proper framing within the undistorted visual content.

In some implementations, the framing recommendation may be provided (e.g., presented on the display(s), provide through speaker(s)) based on user selection. User selection may specify whether or not the framing recommendation is to be provided, mean(s) through which the framing recommendation is to be provided, the frequency with which the framing recommendation is to be provided, and/or other settings relating to the provision of framing recommendation. For example, an image capture device may include options for users to enable/disable provision of framing recommendation and/or when/how often the framing recommendation is provided.

In some implementations, the framing recommendation may be presented on the display 16 responsive to a face or a person being within the visual content captured during the capture duration. Presenting the framing recommendation responsive to a face and/or a person being within the visual content may include using the display 16 to provide a view of the framing recommendation. In some implementations, presenting the framing recommendation responsive to a face and/or a person being within the visual content may include turning on the display 16 and/or changing type of information presented on the display 16. For example, the display 16 may be turned off, and the recommendation component 104 may turn on the display 16 to present the framing recommendation. As another example, the display 16 may be turned on and presenting non-preview information (e.g., setting of the image capture device), and the recommendation component 104 may change display operation to present the framing recommendation.

In some implementations, the framing recommendation may not be presented on the display 16 responsive to a face and/or a person not being within the visual content captured during the capture duration. Not presenting the framing recommendation responsive to a face and/or a person not being within the visual content may include not using the display 16 to provide a view of the framing recommendation. In some implementations, not presenting the framing recommendation responsive to a face and/or a person not being within the visual content may include turning off the display 16 and/or changing type of information presented on the display 16. For example, the display may be turned on and presenting framing recommendation, and the recommendation component 104 may turn off the display 16 to deactivate presentation of the framing recommendation on the display 16. As another example, the display 16 may be turned on and presenting framing recommendation, and the recommendation component 104 may change display operation to present setting of the image capture device and/or other information on the display 16.

In some implementation, the framing recommendation may be automatically turned on based on face/person detection indicating that a person is viewing the display 16 and/or the person is in a position to view the display 16. The framing recommendation may be automatically turned off based on face/person detection indicating that a person is not viewing the display 16 and/or the person is not in a position to view the display 16. Whether or not a face and/or a person is within the visual content may be determined based on analysis of the visual content and/or other information. The visual content captured by the capture component 102 may be analyzed to determine whether a face and/or a person is located within the visual content.

In some implementations, the image capture device may further comprise another display. The other display may be carried on a different side of the housing than the display 16. For example, the image capture device may include a front-facing display (on which the framing recommendation is presented) and a rear-facing display. The framing recommendation may not be presented on the other display (e.g., rear-facing display) during presentation of the framing recommendation on the display 16 (e.g., front-facing display). In some implementations, the other display (e.g., rear-facing display) may be deactivated (e.g., turned off, put into sleep mode) during the presentation of the framing recommendation on the display 16 (e.g., front-facing display). In some implementations, the framing recommendation may be presented on the other display (e.g., front-facing display). The framing recommendation may not be presented on the display 16 (e.g., rear-facing display). The display 16 (e.g., front-facing display) may be deactivated (e.g., turned off, put into sleep mode) during the presentation of the framing recommendation on the other display (e.g., rear-facing display).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
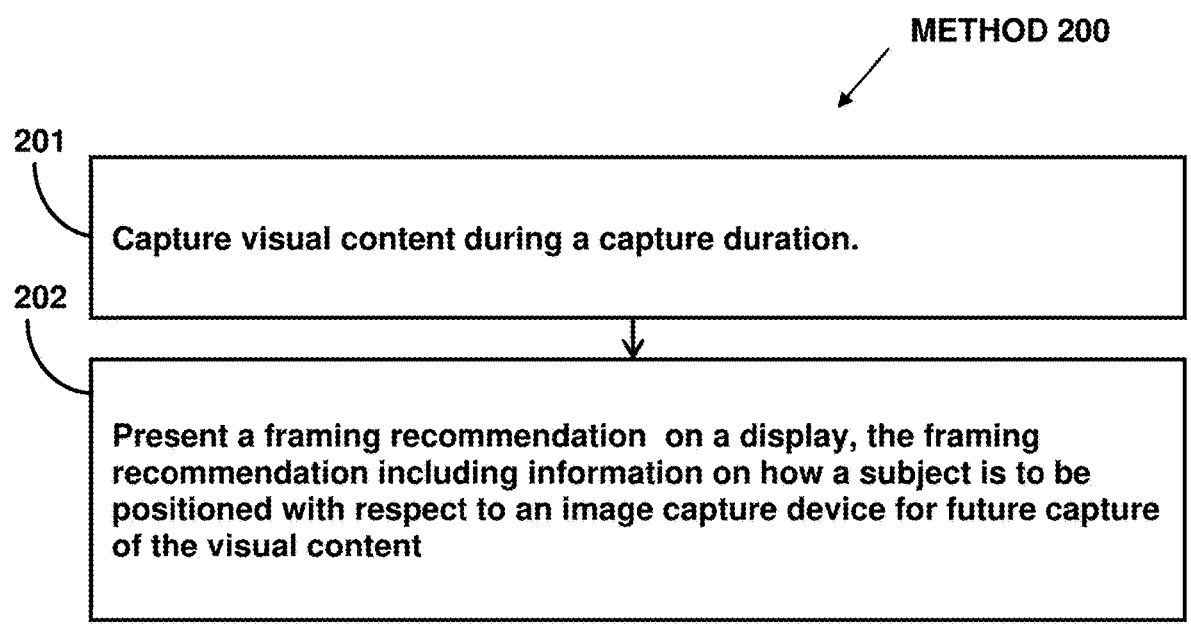
FIG. 2 illustrates an example method for providing framing recommendations.

FIG. 2 illustrates method 200 for providing framing recommendations. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may have multiple sides. The housing may carry one or more of an image sensor, an optical element, a display, and/or other components. The optical element may be carried on a first side of the housing. The optical element may guide light within a field of view to the image sensor. The image sensor may generate a visual output signal conveying visual information defining visual content based on light that becomes incident thereon. The display may be carried on the first side of the housing.

At operation 201, the visual content may be captured during a capture duration. In some implementation, operation 201 may be performed by a processor component the same as or similar to the capture component 102 (Shown in FIG. 1 and described herein).

At operation 202, a framing recommendation may be presented on the display. The framing recommendation may include information on how a subject is to be positioned with respect to the image capture device for future capture of the visual content. In some implementations, operation 202 may be performed by a processor component the same as or similar to the recommendation component 104 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device that provides recommendations for framing, the image capture device comprising:
    a housing having multiple sides;
    an image sensor carried by the housing and configured to generate a visual output signal conveying visual information based on light that becomes incident thereon, the visual information defining visual content;
    an optical element carried on a first side of the housing, the optical element configured to guide light within a field of view to the image sensor;
    a first display carried on the first side of the housing, a display aspect ratio of the first display different from a visual aspect ratio of the visual content captured through the optical element, wherein a preview of the visual content presented on the first display includes a cropped view of the visual content to fit the preview of the visual content within the first display with the display aspect ratio different from the visual aspect ratio of the visual content;
    one or more physical processors carried by the housing, the one or more physical processors configured by machine-readable instructions to:
        capture the visual content during a capture duration; and
        present a framing recommendation on the first display with the preview of the visual content including the cropped view of the visual content, the framing recommendation including information on how a subject is to be positioned with respect to the image capture device for future capture of the visual content, wherein the framing recommendation takes into account the cropping of the visual content in the preview presented on the first display.

2. The image capture device of claim 1, wherein the framing recommendation includes an outline of how the subject should be depicted within the visual content.

3. The image capture device of claim 2, wherein the outline of how the subject should be depicted within the visual content is overlaid on top of a preview of the visual content captured during the capture duration.

4. The image capture device of claim 3, wherein the preview of the visual content includes a silhouette representation of the visual content.

5. The image capture device of claim 1, wherein the framing recommendation includes an arrow indicator that points in a direction in which the subject or the image capture device should be moved.

6. The image capture device of claim 5, wherein size or color of the arrow indicator indicates an extent to which the subject or the image capture device should be moved.

7. The image capture device of claim 1, wherein the preview of the visual content includes a first portion in which the visual content is presented using a linear projection in which a straight line appears straight and a second portion in which the visual content is presented using a non-linear projection in which the straight line appears curved, wherein a location of the second portion indicates where the subject is to be placed, wherein placement of the subject within the second portion causes the preview of the visual content to include an enlarged view of the subject.

8. The image capture device of claim 1, further comprising a second display carried on a second side of the housing, wherein the framing recommendation is not presented on the second display during presentation of the framing recommendation on the first display.

9. The image capture device of claim 8, wherein the second display is deactivated during the presentation of the framing recommendation on the first display.

10. The image capture device of claim 1, wherein the framing recommendation is determined based on a trajectory of a moving thing within the visual content, the framing recommendation providing information on framing of the moving thing to keep up with the moving thing during capture of the visual content.

11. A method for providing recommendations for framing, the method performed by an image capture device including one or more processors, a housing having multiple sides, an image sensor carried by the housing and configured to generate a visual output signal conveying visual information based on light that becomes incident thereon, the visual information defining visual content, an optical element carried on a first side of the housing, the optical element configured to guide light within a field of view to the image sensor, and a first display carried on the first side of the housing, a display aspect ratio of the first display different from a visual aspect ratio of the visual content captured through the optical element, wherein a preview of the visual content presented on the first display includes a cropped view of the visual content to fit the preview of the visual content within the first display with the display aspect ratio different from the visual aspect ratio of the visual content, the method comprising:
    capturing the visual content during a capture duration; and
    presenting a framing recommendation on the first display with the preview of the visual content including the cropped view of the visual content, the framing recommendation including information on how a subject is to be positioned with respect to the image capture device for future capture of the visual content, wherein the framing recommendation takes into account the cropping of the visual content in the preview presented on the first display.

12. The method of claim 11, wherein the framing recommendation includes an outline of how the subject should be depicted within the visual content.

13. The method of claim 12, wherein the outline of how the subject should be depicted within the visual content is overlaid on top of a preview of the visual content captured during the capture duration.

14. The method of claim 13, wherein the preview of the visual content includes a silhouette representation of the visual content.

15. The method of claim 11, wherein the framing recommendation includes an arrow indicator that points in a direction in which the subject or the image capture device should be moved.

16. The method of claim 15, wherein size or color of the arrow indicator indicates an extent to which the subject or the image capture device should be moved.

17. The method of claim 11, wherein the preview of the visual content includes a first portion in which the visual content is presented using a linear projection in which a straight line appears straight and a second portion in which the visual content is presented using a non-linear projection in which the straight line appears curved, wherein a location of the second portion indicates where the subject is to be placed, wherein placement of the subject within the second portion causes the preview of the visual content to include an enlarged view of the subject.

18. The method of claim 11, wherein the image capture device further includes a second display carried on a second side of the housing, and the framing recommendation is not presented on the second display during presentation of the framing recommendation on the first display.

19. The method of claim 18, wherein the second display is deactivated during the presentation of the framing recommendation on the first display.

20. The method of claim 11, wherein the framing recommendation is determined based on a trajectory of a moving thing within the visual content, the framing recommendation providing information on framing of the moving thing to keep up with the moving thing during capture of the visual content.

\* \* \* \* \*